H. W. ROOS.
CLAMPING MECHANISM.
APPLICATION FILED NOV. 1, 1916.
1,268,880.
Patented June 11, 1918.
3 SHEETS—SHEET 1.
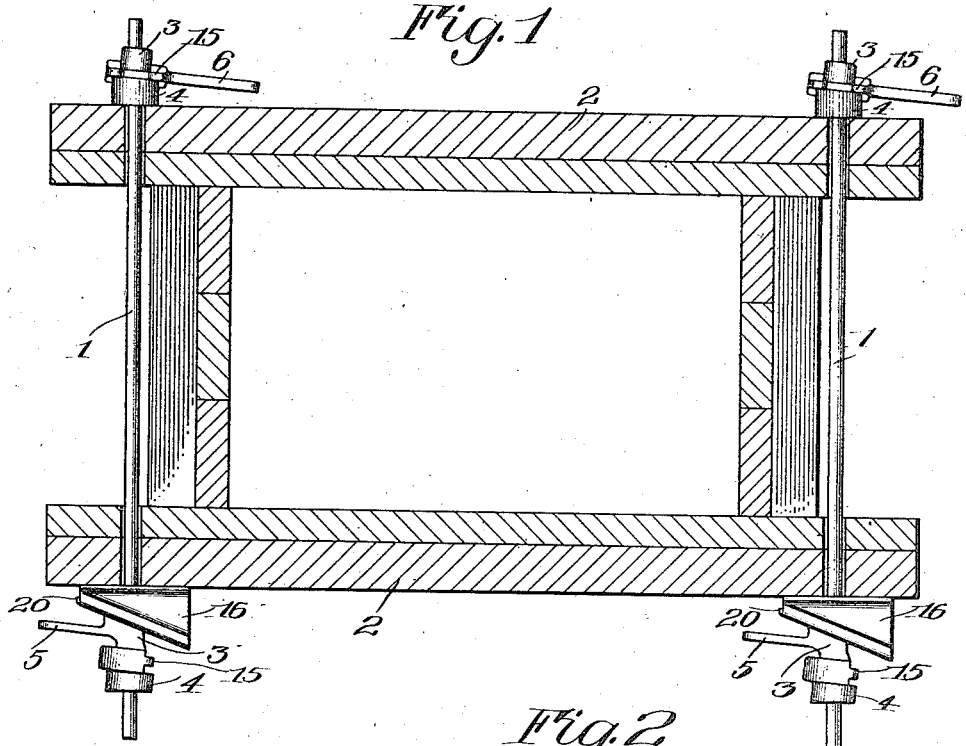
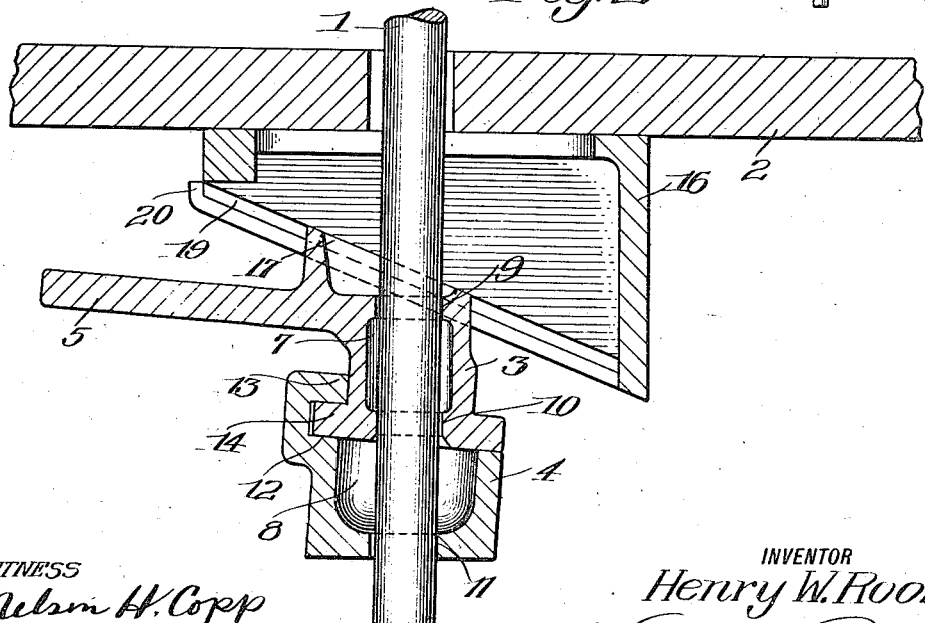
WITNESS
Nelson H. Copp
INVENTOR
Henry W. Roos
BY
his ATTORNEYS

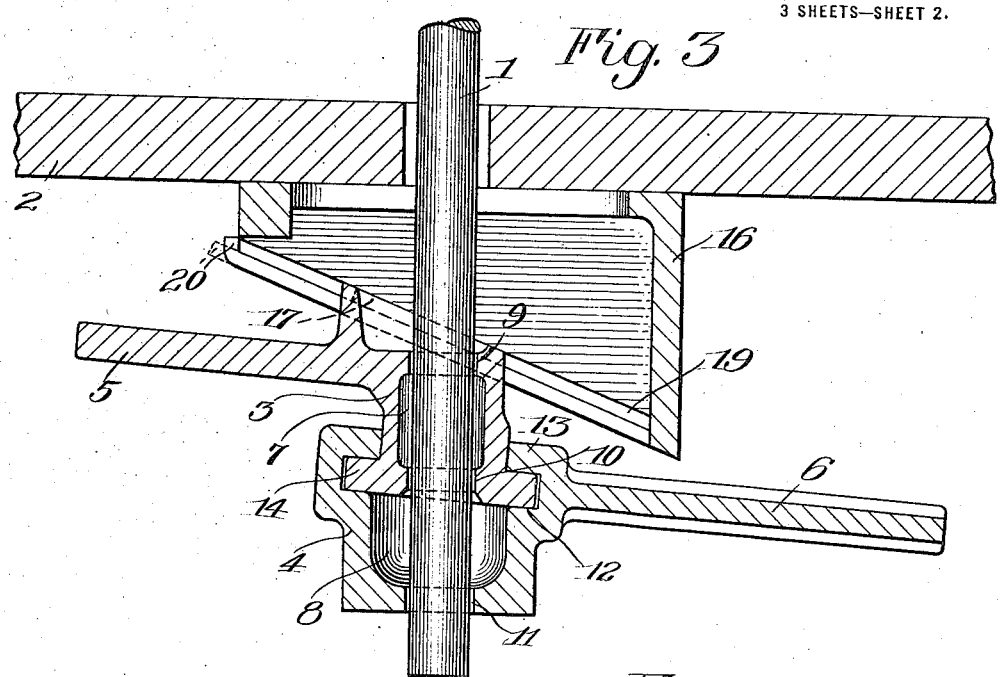
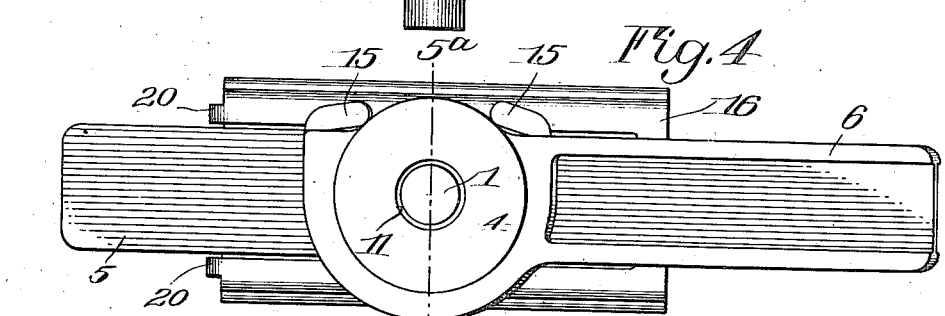
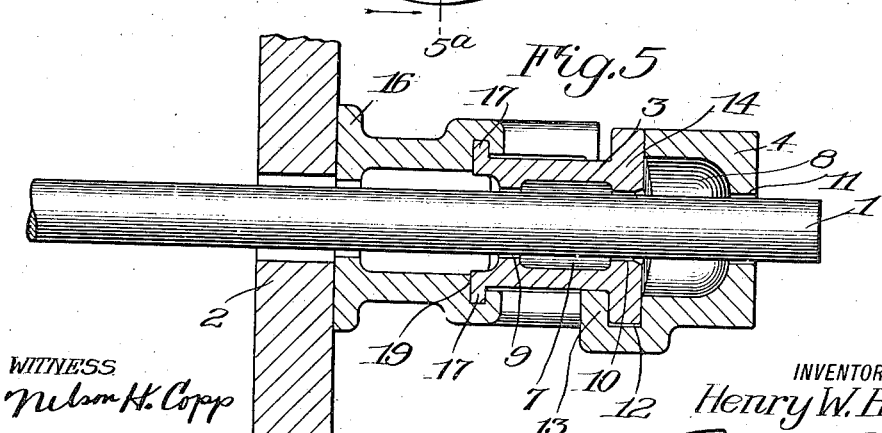

H. W. ROOS.
CLAMPING MECHANISM.
APPLICATION FILED NOV. 1, 1916.
1,268,880.
Patented June 11, 1918.
3 SHEETS—SHEET 3.
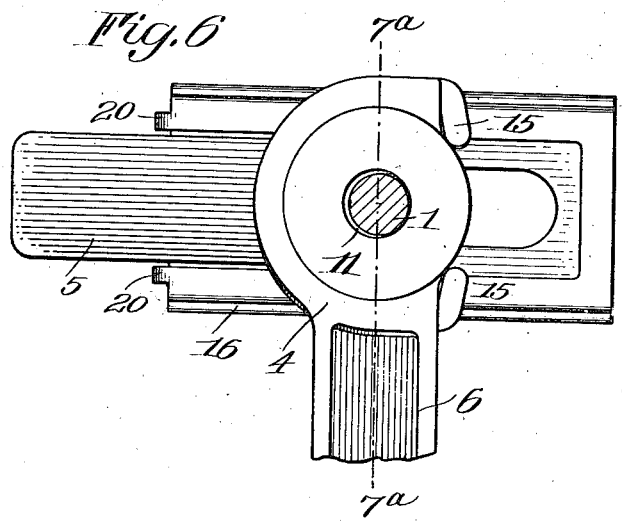
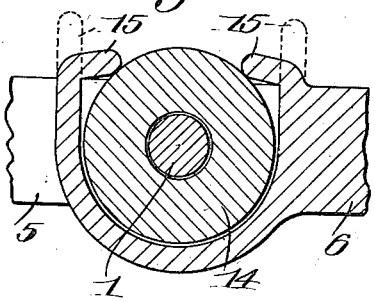
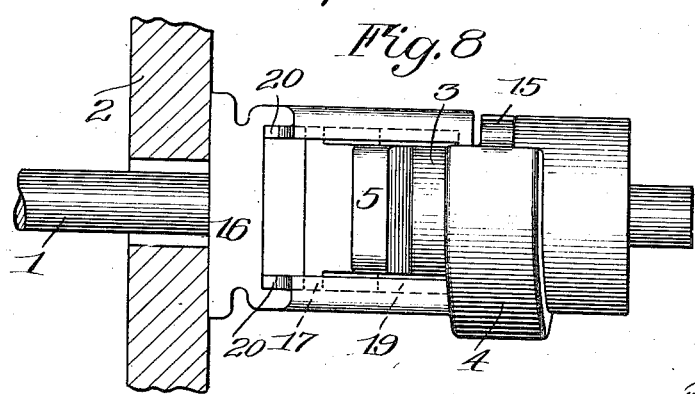
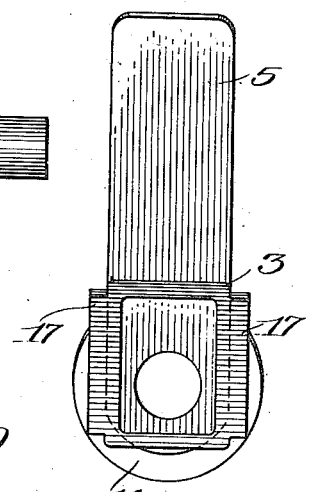
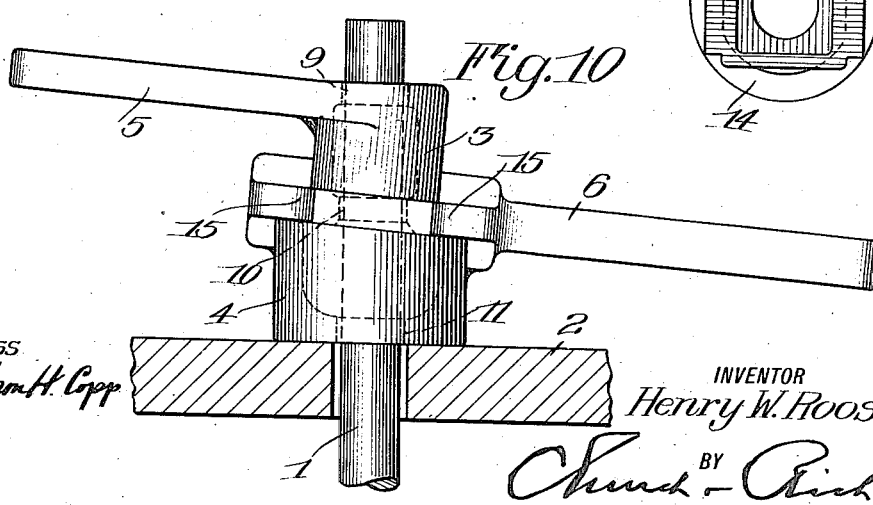
INVENTOR
Henry W. Roos
BY
his ATTORNEYS

UNITED STATES PATENT OFFICE.

HENRY W. ROOS, OF CINCINNATI, OHIO.

CLAMPING MECHANISM.

1,268,880.

Specification of Letters Patent. Patented June 11, 1918.

Application filed November 1, 1916. Serial No. 128,971.

*To all whom it may concern:*

Be it known that I, HENRY W. ROOS, of Cincinnati, in the county of Hamilton and State of Ohio, have invented certain new and useful Improvements in Clamping Mechanisms; and I do hereby declare the following to be a full, clear, and exact description of the same, reference being had to the accompanying drawings, forming a part of this specification, and to the reference characters marked thereon.

My invention has to do with clamping mechanisms, and is concerned particularly with a form of construction that has for its object to rigidly clamp, or grip a rod, or bar or pipe or to rigidly grip and hold together various pipes, rods or shafts which telescope each other or to grip and fasten pulleys, clutches and the like to moving shafts. It is further intended to resist a pull on the rod, bar, pipe or other member as well as a push on same. In the particular application of the invention herein contemplated, a further purpose is the provision of a structure that can be utilized in connection with concrete forms and the like where oppositely disposed walls or frame members are held in fixed relation to each other by a connecting rod, pipe or bar necessitating a quickly removable clamping means for holding the rod in proper relation to retain the walls or parts. It is further intended with my improvement to afford a self-contained unitary structure that is of comparatively simple form and can be easily applied, adjusted and manipulated for either clamping or releasing parts. To these and other ends the invention consists in certain improvements and combination of parts, all as will be hereinafter more fully described, the novel features being pointed out in the claims at the end of the specification.

In the drawings:

Figure 1 is a horizontal sectional view through a concrete form, showing the manner of application of the invention;

Fig. 2 is a horizontal sectional view of the clamping mechanism engaged with the rod;

Fig. 3 is a similar view illustrating the parts in normal or released position;

Fig. 4 is a side elevation of the clamping mechanism with the parts in the released position of Fig. 3;

Fig. 5 is a sectional view on the line 5ª—5ª of Fig. 4;

Fig. 6 is a side elevation of the clamping mechanism with the parts in clamping relation;

Fig. 7 is a sectional view on the line 7ª—7ª of Fig. 6, and illustrating in dotted lines one of the steps in the construction;

Fig. 8 is an end view of the clamping mechanism;

Fig. 9 is a detail view in elevation of one of the clamping members, and

Fig. 10 is a plan view of the clamping mechanism as employed when the wedge device is omitted.

Similar reference characters in the several figures indicate the same parts.

In the construction disclosed in the present embodiment, which is intended for purposes of illustration only, and does not in any way restrict the field of use or scope of the invention, 1 designates a rod, bar, pipe or member, to which the clamping mechanism is applied at opposite ends, as illustrated in Fig. 1, to engage against the side walls 2 of the form, and hold the latter in fixed adjustment. The clamping mechanism includes a pair of clamping members, designated generally at 3 and 4, and provided with handles or operating portions 5 and 6. The members 3 and 4 are hollow, provided with interior openings 7 and 8 respectively for receiving the member or rod 1. The opening 7 of the member 3 is surrounded by a pair of gripping surfaces 9 and 10, while the member 4 includes a single gripping surface 11, thus affording three points of engagement with the rod, as indicated clearly in Figs. 2 and 3, and when the clamping members are so disposed with reference to each other that the several gripping surfaces are all in alinement, as indicated in Fig. 3, the rod is released and free to move. In order to effect clamping, I provide for a relative movement between the clamping members that serves to actuate one of the gripping surfaces transversely of the member or rod, or transversely of its longitudinal axis, offsetting one of the gripping surfaces with reference to the other two, as indicated in Fig. 2, and I will now describe the means by which this is accomplished.

The clamping members are preferably associated in relatively rotatable relation, such that the plane of relative rotation is inclined with reference to a plane perpendicular to the longitudinal axis of the member or rod, so that when one of the clamping members is rotated with reference to the other, the corresponding gripping surface is caused to move transversely of the rod. Exterior connecting means is provided between the clamping members for effecting this action, and with this in view, the member 4 is provided with a socket including a seat 12 and overhanging portion or flange 13, and within said socket is received a projecting portion or base 14 carried by the member 3 and resting upon the seat 12. The seat or bearing 12 is inclined with reference to a plane at right angles or perpendicular to the longitudinal axis of the rod, and when the member 4 is turned with reference to the member 3, the plane of rotation is the same as the plane of the seat or bearing 12, so that it turns about an axis extending angularly of the longitudinal axis of the member or rod, the result of which is to cause the gripping surface 11 to move transversely of the rod, and grip the latter, as shown in Fig. 2. The clamping engagement is maintained by the frictional holding of the parts, and is released by grasping the handles 5 and 6, and forcing them back to their normal or releasing positions, as shown in Fig. 3. The two clamping members are preferably held in permanent relation to each other by means of lugs or extensions 15, carried by the member 4. It will be observed that the socket formed in the latter is of generally U-shaped formation in cross section, as indicated in Fig. 7, to permit the base or plate 14 to be inserted therein when the parts are assembled, and after they are thus positioned the lugs 15 are bent over, as shown in full lines in Fig. 7, and retain the projecting plate within the socket, permitting relative rotation of the parts, and at the same time preventing removal of one from the other.

In the particular application in which the invention is shown and frequently used, it is desirable to employ a wedge between the wall to be retained and the clamping device, and with this in view I use a wedge device 16, which is permanently connected with the clamping member 3 in the following manner.

The clamping member 3 carries flanges or guides 17 which engage guideways 19 formed on the outer inclined surface of the wedge member. The latter also is provided with lugs or extensions 20, which are bent over the ends of the guideway 19 in order to prevent removal of the clamping member which is slidably related with the wedge device, so that the latter can be moved laterally of the member or rod, as indicated in Fig. 3. In the operation of the device when the wedge is employed, the entire mechanism is applied to a member or rod, and the clamping members are then operated to tightly grip the parts whereupon the wedge device is driven laterally to force it against the wall of the form where it is held by the frictional engagement of the parts.

While I have shown the construction in connection with a wedge device, it will be understood that the clamping mechanism that coöperates with the rod may be employed in various relations wherever it is desirable to hold a rod, pipe or bar, or where it is intended to grip or fasten a plurality of rods, pipes, or bars which telescope each other for purposes of gripping and resisting a pull or push on the various parts, and the present application is intended to cover any modification or use of the structure coming within the terms of the claims and purpose of the improvement, and irrespective of whether it is operated in conjunction with a wedge device or otherwise. Although the clamping means is herein described and shown for holding a rod or bar in connection with the retaining of concrete forms, it may be used for retaining a rod or bar or pipe in any position for any other purpose.

I claim as my invention:

1. A clamping mechanism including a pair of members relatively rotatable about an axis passing longitudinally through the member to be clamped and having interiorly arranged openings which receive a member to be clamped and are surrounded by gripping surfaces engaging said member, and exteriorly disposed means connecting the members permitting their relative rotation, and serving, when one is turned relatively to the other, to vary the relative position of said openings and gripping surfaces transversely of the member to be clamped.

2. A clamping mechanism including a pair of members which are relatively rotatable about an axis passing longitudinally through the member to be clamped, and have openings through which said member passes, one having engagement with the member to be clamped at a plurality of points in spaced relation longitudinally, and the other member having an engaging opening rotatable about an axis extending angularly of the member to be clamped, whereby said openings are moved transversely of one another and of the member to be clamped when the first mentioned members are rotated relatively.

3. A clamping mechanism including a pair of members relatively rotatable about an axis passing longitudinally through a member to be clamped and which are hollow to receive a member to be clamped and provided with interior gripping surfaces, and connections between the members permitting their relative rotation and acting when one is turned relatively to the other to move one of said gripping surfaces transversely of the member.

4. A clamping mechanism including a pair of hollow members relatively rotatable about an axis passing longitudinally through a member to be clamped and having interiorly arranged gripping surfaces, and exterior controlling means connecting the members and acting when one is turned relatively to the other to move one of said gripping surfaces transversely of the member.

5. A clamping mechanism including a pair of hollow members having interior gripping surfaces normally arranged concentrically of the member to be clamped, one of said members having a socket coöperating with a projecting portion of the other, permitting relative rotation of said members, and having its bearing surface inclined with reference to a plane perpendicular to the axis of the member to be clamped.

6. A clamping mechanism including a pair of hollow members having interiorly arranged gripping surfaces normally concentric of the longitudinal axis of a member to be clamped, and connections between the members permitting relative rotation in a plane inclined with reference to a plane perpendicular to the longitudinal axis of the member to be clamped.

7. A clamping mechanism including a pair of hollow members having interiorly arranged gripping surfaces normally concentric of the longitudinal axis of a member to be clamped, a socket or bearing on one of the members, and a base or projecting portion on the other having engagement with said socket and supported upon and rotatable on a surface lying in a plane inclined to a plane perpendicular to the longitudinal axis of the member to be clamped.

8. A clamping mechanism including a pair of connected and relatively rotatable members, each having gripping surfaces normally concentric of the longitudinal axis of a member to be clamped and a plane of relative rotation being inclined to a plane perpendicular to the longitudinal axis of the member to be clamped.

9. The combination with a clamping mechanism including a pair of relatively rotatable gripping members having rod gripping surfaces normally concentric of the longitudinal axis of a member to be clamped, of a wedge device adjustably supported on one of said members and permitting said clamping mechanism to be adjustably positioned with reference to a supporting frame.

10. The combination with a clamping mechanism including a pair of relatively rotatable gripping members, of a wedge device having a guideway thereon permitting said clamping mechanism to be adjustably positioned with respect to a supporting frame, and projections on one of the gripping members engaging said guideway and permitting relative sliding of the wedge member and gripping member.

11. The combination with a clamping mechanism including a pair of members having interiorly arranged engaging openings normally disposed concentrically of the longitudinal axis of the member to be clamped and surrounded by gripping surfaces, and exteriorly disposed means connecting the members permitting relative rotation of said members and serving, when one is turned relatively to the other, to vary the relative position of said gripping surfaces transversely of the member to be clamped, of a wedge device adjustably connected with one of the members, and permitting said clamping mechanism to be adjustably positioned with respect to a supporting frame.

12. The combination with a clamping mechanism including a pair of members, one engaging the member to be clamped at a plurality of points in spaced relation longitudinally, and the other member having an engaging opening surrounded by a gripping surface and rotatable about an axis extending angularly of the axis of the member to be clamped whereby said gripping surface is moved transversely when the latter member is rotated, of a wedge device adjustably connected with one of the members, and permitting said clamping mechanism to be adjustably positioned with respect to a supporting frame.

13. The combination with a clamping mechanism including a pair of hollow members relatively rotatable about an axis passing longitudinally through the member to be clamped and provided with interior gripping surfaces, and connections between the members permitting their relative rotation and acting when one is turned relatively to the other to move one of said gripping surfaces transversely of the member to be clamped, of a wedge device adjustably connected with one of the members, and permitting said clamping mechanism to be adjustably positioned with respect to a supporting frame.

14. The combination with a clamping mechanism including a pair of members relatively rotatable about an axis passing longitudinally through the member to be clamped and having openings to receive a member to be clamped and interiorly arranged gripping surfaces, a socket on one of the members coöperating with a projecting portion of the other permitting relative rotation of the members and having its bearing surface inclined to a plane perpendicular to the axis of the member to be clamped, of a wedge device adjustably connected with one of the members, and permitting said clamping mechanism to be adjustably positioned with respect to a supporting frame.

15. The combination with a clamping mechanism including a pair of connected members relatively rotatable about an axis passing longitudinally through the member to be clamped, each having gripping surfaces, and the plane of relative rotation being inclined to a plane perpendicular to the longitudinal axis of the member to be clamped, of a wedge device adjustably connected with one of the members, and permitting said clamping mechanism to be adjustably positioned with respect to a supporting frame.

16. A clamping mechanism including a pair of members having gripping surfaces normally concentric of the longitudinal axis of a member to be clamped, and a socket on one of the members coöperating with a projecting portion of the other permitting relative rotation of said member and having its bearing surface inclined to a plane perpendicular to the axis of the member to be clamped.

17. A rod clamping mechanism including a pair of members having rod gripping surfaces normally concentric of the longitudinal axis of a member to be clamped, a socket or bearing on one of the members, and a base or projecting portion on the other having engagement with said socket permitting relative rotation of said members and supported upon and rotatable on a surface lying in a plane inclined to a plane perpendicular to the longitudinal axis of the rod.

HENRY W. ROOS.